US012749970B2

(12) United States Patent
Morikawa et al.

(10) Patent No.: US 12,749,970 B2
(45) Date of Patent: Sep. 29, 2026

(54) POWER SUPPLY CONTROL DEVICE AND STORAGE MEDIUM

(71) Applicant: DENSO TEN Limited, Kobe (JP)

(72) Inventors: Seiya Morikawa, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 115 days.

(21) Appl. No.: 18/436,563

(22) Filed: Feb. 8, 2024

(65) Prior Publication Data

US 2025/0038658 A1 Jan. 30, 2025

(30) Foreign Application Priority Data

Jul. 26, 2023 (JP) ................................ 2023-121943

(51) Int. Cl.

| | |
|---|---|
| ***H02H 11/00*** | (2006.01) |
| ***B60R 16/00*** | (2006.01) |
| ***B60R 16/033*** | (2006.01) |
| ***H02H 7/22*** | (2006.01) |
| ***H02M 3/04*** | (2006.01) |

(52) U.S. Cl.
CPC ................ *H02M 3/04* (2013.01); *H02H 7/22* (2013.01)

(58) Field of Classification Search
CPC ......... H02M 3/04; H02H 7/22; H02H 11/008; B60R 16/005; B60R 16/033
USPC ............................................................ 307/18
See application file for complete search history.

(56) References Cited

U.S. PATENT DOCUMENTS

| | | | | |
|---|---|---|---|---|
| 2021/0316679 A1* | 10/2021 | Morita | .................. | B60R 16/033 |
| 2022/0306020 A1* | 9/2022 | Matsumoto | ........... | B60R 16/033 |
| 2023/0198290 A1* | 6/2023 | Kobayashi | ................ | H02J 1/10 307/23 |

FOREIGN PATENT DOCUMENTS

JP 2009-083527 A 4/2009

* cited by examiner

*Primary Examiner* — Rexford N Barnie
*Assistant Examiner* — Swarna N Chowdhuri
(74) *Attorney, Agent, or Firm* — Oliff PLC

(57) ABSTRACT

A power supply control device includes: a first switch coupled between a main power supply and a load; a second switch coupled between a sub-power supply and the load; and a controller configured to perform on/off control of the first switch and the second switch. The controller is configured to: turn off the first switch and turn on the second switch, in response to an ignition switch being turned off; and turn off the second switch and then turn on the first switch, in response to the ignition switch being turned on.

6 Claims, 14 Drawing Sheets

POWER SUPPLY CONTROL DEVICE AND STORAGE MEDIUM

CROSS-REFERENCE RELATED APPLICATIONS

This application is based on and claims priority under 35 USC 119 from Japanese Patent Application No. 2023-121943 filed on Jul. 26, 2023, the contents of which are incorporated herein by reference.

TECHNICAL FIELD

Embodiments disclosed herein relate to a power supply control device and a storage medium storing a power supply control program.

BACKGROUND ART

There is a system including a load that is operated by supplying electric power during a period in which an ignition switch (hereinafter, referred to as "IG") of a vehicle is turned off, and a load that is operated by supplying electric power during a period in which the IG is turned on (for example, see Japanese Patent Application Laid-open Publication No. 2009-83527 (hereinafter, referred to as Patent Literature 1)).

In such a system, when electric power is supplied from the main power supply to the load in a case where the electric power is supplied to the load operating during the period in which the IG is turned off, the electric power from the main power supply may be insufficient when the IG is turned on and the electric power supply to each load is started.

Therefore, it is desirable to provide a sub-power supply for supplying electric power during the period in which the IG is turned off and supply electric power from the sub-power supply to the load during the period in which the IG is turned off.

However, when the IG is turned on while the electric power is being supplied to the load in the period in which the IG is turned off, a surge may occur when switches of the respective units are changed between on and off, leading to a failure of the switch.

An aspect of the embodiments has been made in view of the above, and an object thereof is to provide a power supply control device and a power supply control program that are capable of preventing a failure of a switch even when a surge occurs when an IG is turned on and electric power supply from a main power supply to a load is started.

SUMMARY

One aspect of the present disclosure relates to a power supply control device including: a first switch coupled between a main power supply and a load; a second switch coupled between a sub-power supply and the load; and a controller configured to perform on/off control of the first switch and the second switch. The controller is configured to: turn off the first switch and turn on the second switch, in response to an ignition switch being turned off; and turn off the second switch and then turn on the first switch, in response to the ignition switch being turned on.

The power supply control device and the power supply control program according to an aspect of the embodiments exhibit an effect of being capable of preventing a failure of a switch even when a surge occurs when an IG is turned on and electric power supply from a main power supply to a load is started.

BRIEF DESCRIPTION OF DRAWINGS

Exemplary embodiments of the present disclosure will be described in detail based on the following figures, wherein.

DESCRIPTION OF EMBODIMENTS

Hereinafter, embodiments of a power supply control device and a power supply control method will be described in detail with reference to the accompanying drawings. The present disclosure is not limited to the following embodiments. The power supply control device according to the embodiments are a device that performs control to supply electric power to an electronic device (hereinafter, referred to as a "load") mounted on a vehicle.

1. First Embodiment

Figure 1:
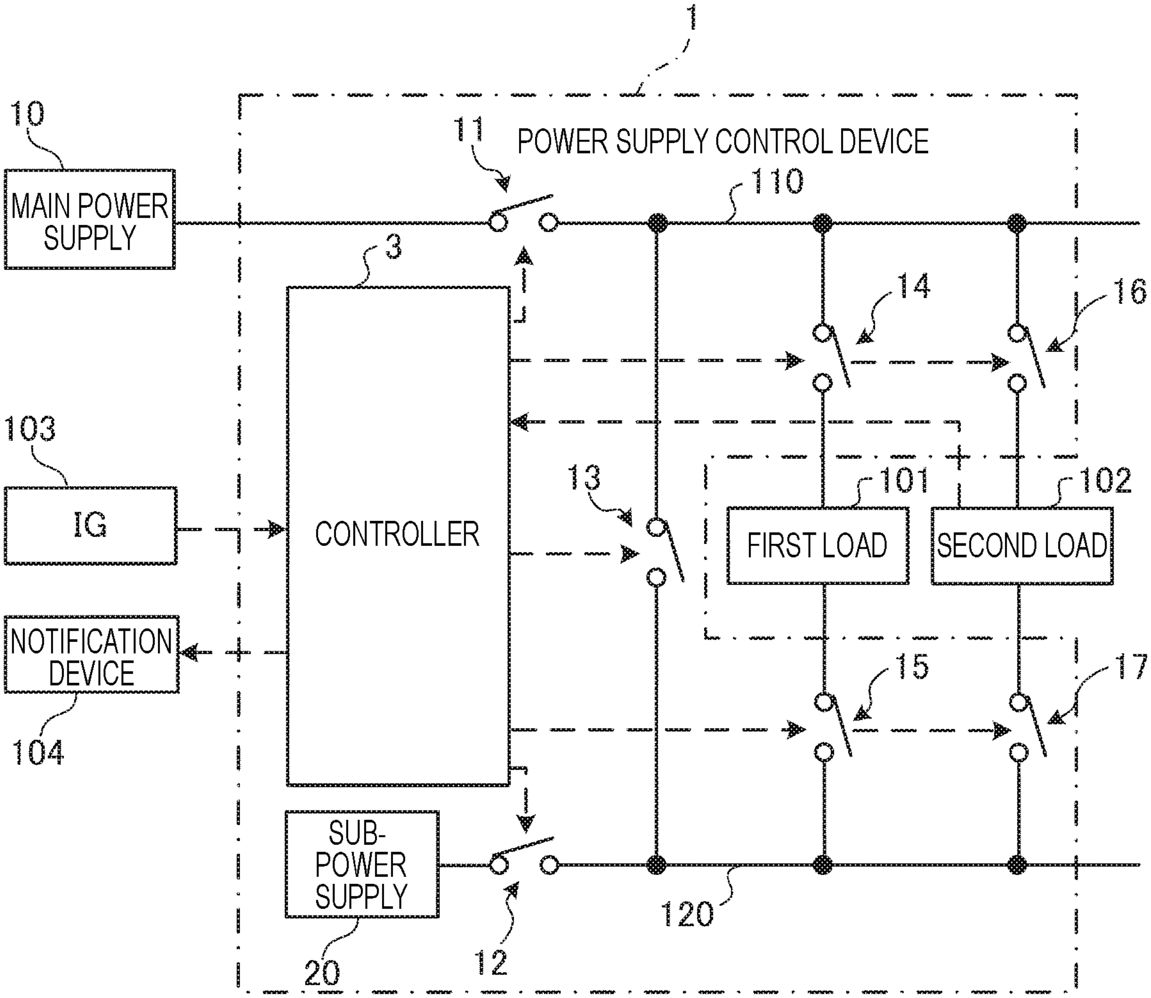
FIG. 1 is a diagram illustrating a configuration example of a power supply control device according to a first embodiment.

1-1. Configuration Example of Power Supply Control Device According to First Embodiment FIG. 1 is a diagram illustrating a configuration example of a power supply control device 1 according to a first embodiment. As illustrated in FIG. 1, the power supply control device 1 is connected to a main power supply 10, a first load 101, a second load 102, an ignition switch (hereinafter referred to as "IG 103") of a vehicle, and a notification device 104.

The main power supply 10 is, for example, a lead battery mounted on the vehicle. The main power supply 10 may be a secondary battery other than the lead battery. The first load 101 is a device that operates during a period in which the IG 103 is turned on, and is various electronic devices related to traveling of the vehicle or the like. The first load 101 includes, for example, an engine control device, a steering control device, a brake control device, an audio device, and a video display device.

The second load 102 is an electronic device capable of operating at all times (including when an accessory switch is turned on), that is, in the period in which the IG 103 is turned off and the period in which the IG 103 is turned on. The second load 102 includes, for example, a drive recorder, a security device, and an in-vehicle outlet for supplying electric power to an external device. The notification device 104 includes a display device that displays various notification messages to a user, a sound reproduction device that reproduces notification messages, and the like.

The power supply control device 1 includes a sub-power supply 20, a first system 110, a second system 120, first to seventh switches 11 to 17, and a controller 3. The sub-power supply 20 may be, for example, a lithium-ion battery, and the sub-power supply 20 may be a secondary battery other than the lithium-ion battery.

The sub-power supply 20 supplies electric power to the second load 102 during the period in which the IG 103 is turned off. The sub-power supply 20 also functions as a backup power supply that supplies electric power to the first load 101 and the second load 102 instead of the main power supply 10 when a power supply failure occurs in the main power supply 10.

The first system 110 is a power supply line through which the electric power from the main power supply 10 is supplied to the first load 101 and the second load 102. The second system 120 is a power supply line through which the electric power from the sub-power supply 20 is supplied to the first load 101 and the second load 102.

The first switch 11 is a switch capable of connecting and disconnecting the main power supply 10 and the first system 110. The second switch 12 is a switch capable of connecting and disconnecting the sub-power supply 20 and the second system 120.

The third switch 13 is an inter-system switch capable of connecting and disconnecting the first system 110 and the second system 120. The third switch 13 may be a DCDC converter (DC/DC) that adjusts a voltage difference between the first system 110 and the second system 120. When the third switch 13 is a DC/DC, the DC/DC connects the first system 110 and the second system 120 by an operation, and disconnects the first system 110 and the second system 120 by stopping the operation.

The fourth switch 14 is a switch capable of connecting and disconnecting the first system 110 and the first load 101. The fifth switch 15 is a switch capable of connecting and disconnecting the second system 120 and the first load 101.

The sixth switch 16 is a switch capable of connecting and disconnecting the first system 110 and the second load 102. The seventh switch 17 is a switch capable of connecting and disconnecting the second system 120 and the second load 102.

The controller 3 includes a microcomputer including a central processing unit (CPU), a read only memory (ROM), and a random access memory (RAM), and various circuits. The controller 3 controls the first to seventh switches 11 to 17 by the CPU executing a program stored in the ROM using the RAM as a work area.

When a signal indicating that the IG 103 is turned on or a signal indicating that the IG 103 is turned off is received, the controller 3 controls the first to seventh switches 11 to 17 according to the received signal.

The controller 3 monitors a failure of the first system 110 and the second system 120 based on detection results of a voltage sensor (not illustrated) that detects a voltage of the first system 110 and a voltage sensor (not illustrated) that detects a voltage of the second system 120. When a failure occurs in any one of the systems, the controller 3 controls the first to seventh switches 11 to 17 to supply electric power to the first load 101 and the second load 102 by the other system.

A part or all of the controller 3 may be implemented by hardware such as an application specific integrated circuit (ASIC) or a field programmable gate array (FPGA).

Figure 2:
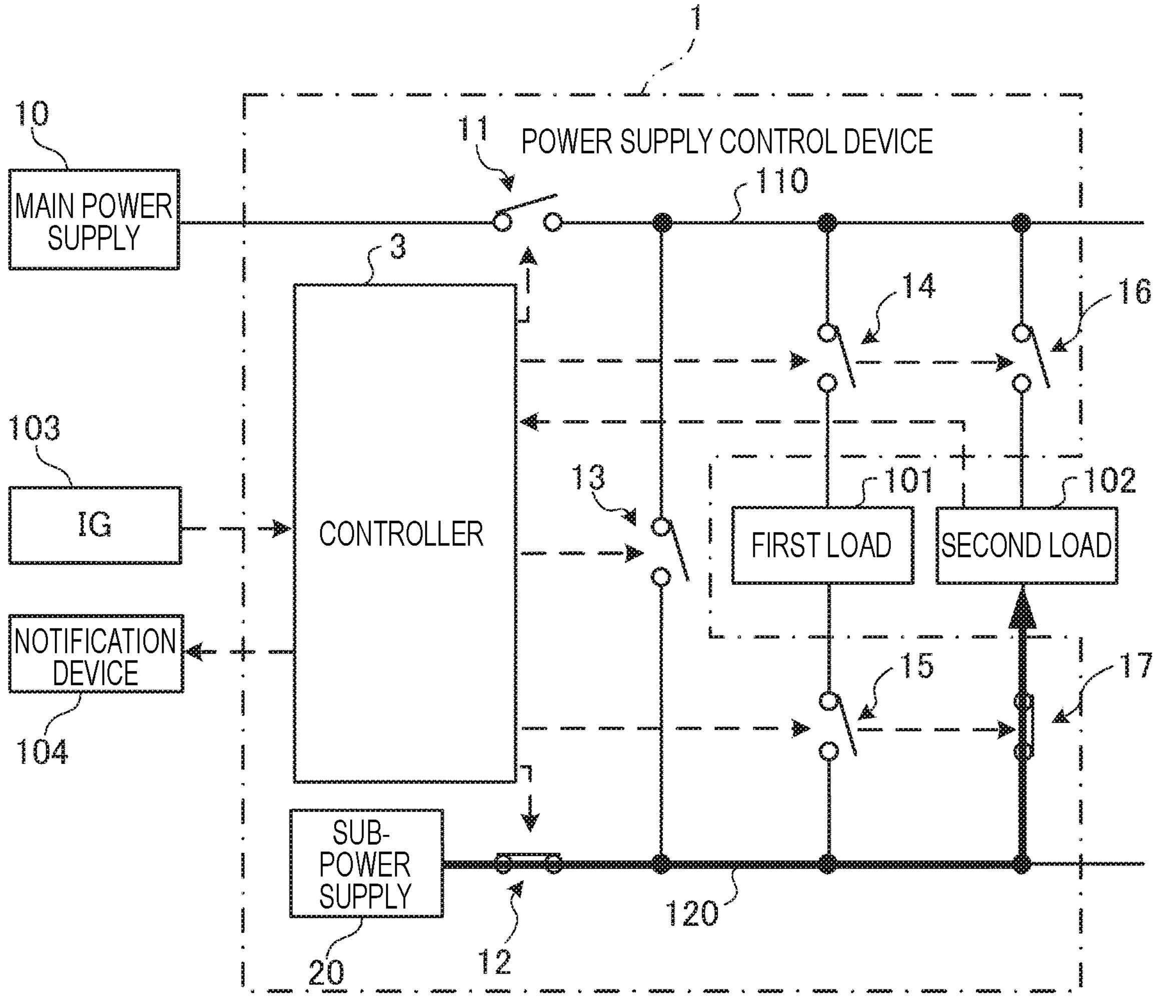
FIG. 2 is a diagram illustrating an operation example of the power supply control device according to the first embodiment.
Figure 3:
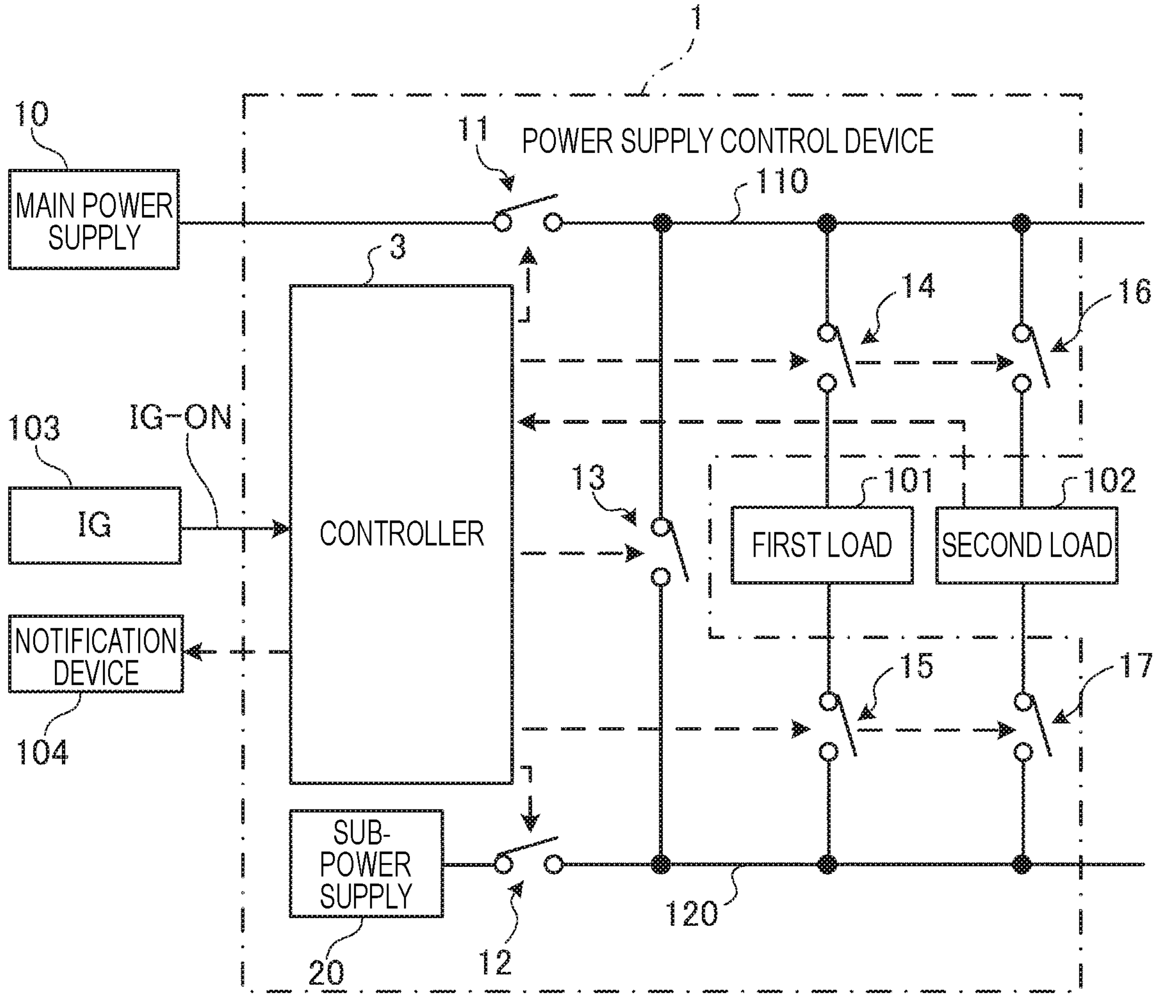
FIG. 3 is a diagram illustrating an operation example of the power supply control device according to the first embodiment.
Figure 4:
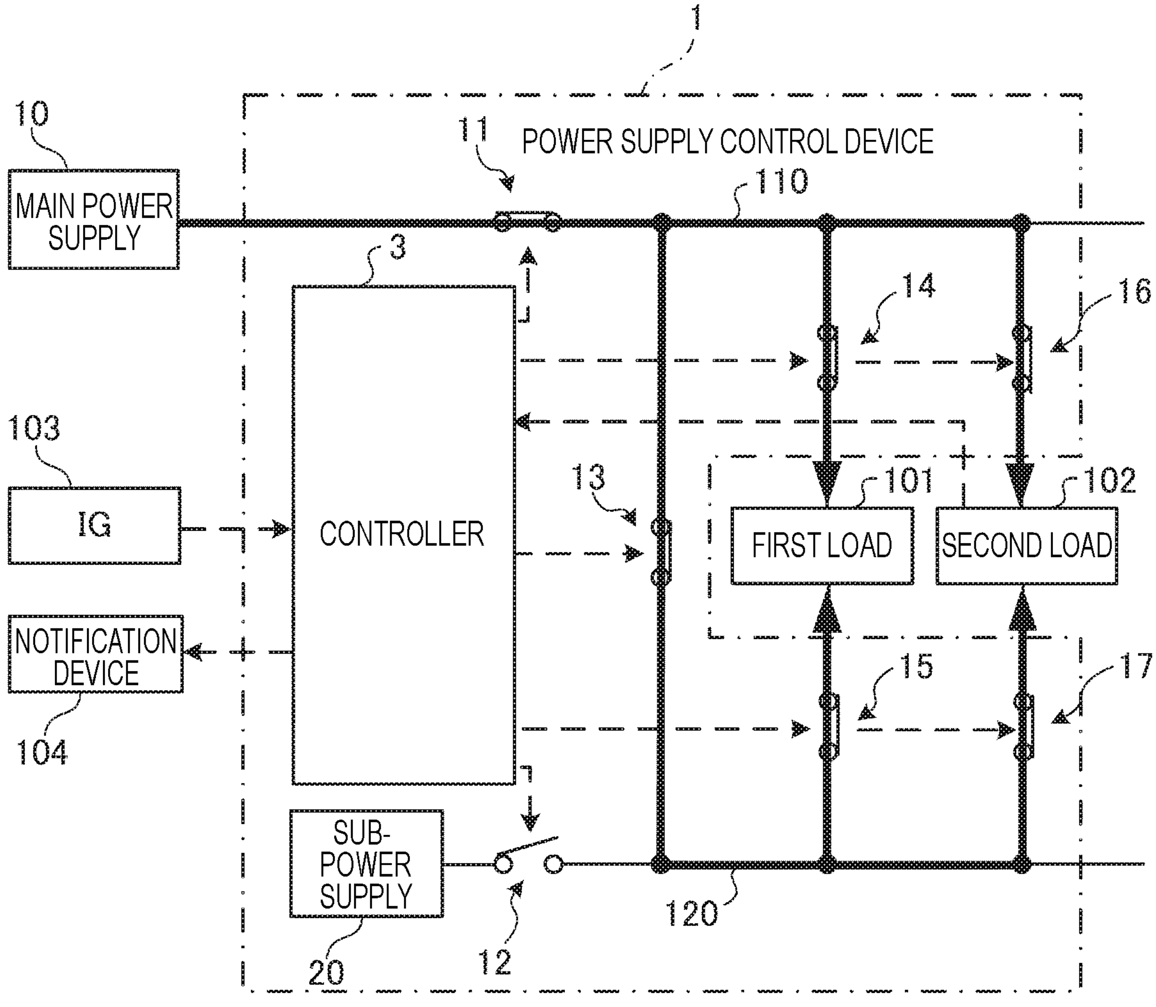
FIG. 4 is a diagram illustrating an operation example of the power supply control device according to the first embodiment.

1-2. Operation Example of Power Supply Control Device According to First Embodiment Next, an operation example of the power supply control device 1 according to the first embodiment will be described with reference to FIGS. 2 to 4. FIGS. 2 to 4 are diagrams illustrating an operation example of the power supply control device 1 according to the first embodiment.

When the vehicle is in parking, that is, when the IG 103 is turned off, as illustrated in FIG. 2, the power supply control device 1 turns off the first switch 11 and the third to sixth switches 13 to 16, turns on the second switch 12 and the seventh switch 17, and supplies electric power from the sub-power supply 20 to the second load 102. Accordingly, the power supply control device 1 may operate, for example, the security device during parking.

Thereafter, when the IG 103 is turned on, the power supply control device 1 turns off the second switch 12, turns on the first switch 11 and the third to seventh switches 13 to 17, and supplies electric power from the main power supply 10 to the first load 101 and the second load 102.

However, when the power supply control device 1 turns on the first switch 11 in a state where the second switch 12 is turned on immediately after the IG 103 is turned on, and then turns off the second switch 12 in a state where a current flows therein, a surge may occur and the second switch 12 may fail.

Therefore, when the turn-on of the IG 103 is detected, the controller 3 temporarily keeps the first switch 11 off, and then turns on the first switch 11 to supply electric power from the main power supply 10 to the first load 101.

At this time, for example, as illustrated in FIG. 3, when receiving, from the vehicle, a signal IG-ON indicating that the IG 103 is turned on, the controller 3 may turn off the seventh switch 17 in a state where the first switch 11 is temporarily kept off, and then turn off the second switch 12.

Accordingly, when the second switch 12 is turned off, no current flows through the second switch 12. Therefore, even if the second switch 12 is turned off, the controller 3 may prevent a failure of the second switch 12 due to a surge.

Thereafter, as illustrated in FIG. 4, the controller 3 turns on the first switch 11 and the third to seventh switches 13 to 17 in a state where the second switch 12 is turned off, and supplies the electric power from the main power supply 10 to the first load 101 and the second load 102. Accordingly, the power supply control device 1 may bring the vehicle into a travelable state.

Here, the controller 3 turns off the seventh switch 17 before turning off the second switch 12, but this is an example. If power consumption of the second load 102 is less than predetermined electric power, even when the power supply control device 1 turns off the second switch 12 while the seventh switch 17 is kept on, the possibility that the second switch 12 fails due to a surge is low.

When the turn-on of the IG 103 is detected, if there is the second load 102 whose power consumption is equal to or larger than the predetermined electric power, the controller 3 may request the user to stop an operation of the second load 102. For example, when the turn-on of the IG 103 is detected, the controller 3 causes the notification device 104 to output a notification message such as "please stop the external device" when the user connects to the in-vehicle outlet and uses the external device. Whether the power consumption of the external device is equal to or larger than the predetermined electric power may be detected by a current sensor or the like (not illustrated) detecting a current flowing through the outlet included in the second load 102.

Accordingly, in the power supply control device 1, if the user stops the operation of the second load 102 in response to the stop request, no current flows through the second switch 12 when the second switch 12 is turned off as the IG 103 is turned on, and thus a failure of the second switch 12 due to a surge may be prevented.

When the power consumption of the second load 102 decreases to less than the predetermined electric power after requesting the stop of the operation, the controller 3 may turn off the second switch 12 and then turn on the first switch 11. Accordingly, in the power supply control device 1, since the current flowing through the second switch 12 decreases at a time when the second switch 12 is turned off, even when the second switch 12 is turned off, a failure of the second switch 12 due to a surge may be prevented.

When a predetermined time period has elapsed after requesting the stop of the operation, the controller 3 may turn off the second switch 12 and then turn on the first switch 11. Accordingly, if the user stops the operation of the second load 102 in response to the stop request during the predetermined time period, when the second switch 12 is turned off, the power supply control device 1 may prevent the failure of the second switch 12 due to the surge and prevent a delay in the start of a post-startup process.

When the turn-on of the IG 103 is detected, if there is the second load 102 whose power consumption is equal to or larger than the predetermined electric power, the controller 3 notifies the user that the second load 102 is to be stopped, stops the operation of the second load 102, turns off the second switch 12, and then turns on the first switch 11.

Accordingly, since the second load 102 is not already operated and no current flows through the second switch 12 at the time of turning off the second switch 12, the power supply control device 1 may prevent the failure of the second switch 12 due to the surge when the second switch 12 is turned off.

When the turn-on of the IG 103 is detected, if there is a device in which a change due to instantaneous interruption of electric power supply is recognized by the user, the controller 3 notifies the user that the change occurs, and then turns off the second switch 12 and then turns on the first switch 11.

For example, when the turn-on of the IG 103 is detected, the controller 3 causes the notification device 104 to output a notification message such as "output is temporarily interrupted" when the user is using the external device.

Accordingly, by the power supply control device 1, the user may recognize that a change in an operation state of the second load 102 due to the turn-on of the IG 103 is not a failure.

1-3. Process Performed by Controller According to First Embodiment

Next, a process performed by the controller 3 of the power supply control device 1 will be described with reference to FIGS. 5 to 8. FIGS. 5 to 8 are flowcharts illustrating examples of processes performed by the controller 3 of the power supply control device 1 according to the first embodiment.

Figure 5:
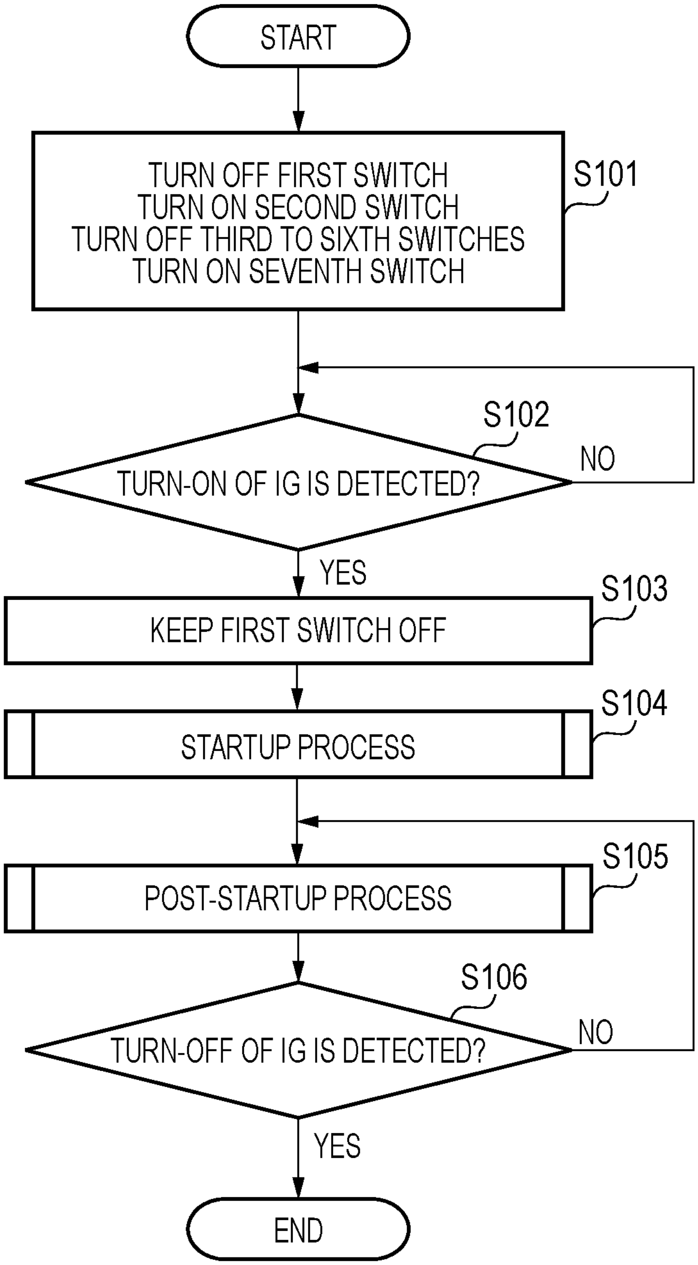
FIG. 5 is a flowchart illustrating an example of a process performed by a controller of the power supply control device according to the first embodiment.

When the turn-off of the IG 103 is detected, the controller 3 performs a process illustrated in FIG. 5. Specifically, as illustrated in FIG. 5, the controller 3 first turns off the first switch 11 and turns on the second switch 12 (step S101).

At this time, the controller 3 turns off the third to sixth switches 13 to 16 while keeping the seventh switch 17 on (step S101). Accordingly, the controller 3 may operate the second load 102 by supplying electric power from the sub-power supply 20 to the second load 102 while the IG 103 is turned off.

Thereafter, the controller 3 determines whether the turn-on of the IG 103 is detected (step S102). When the turn-on of the IG 103 is not detected (step S102, No), the controller 3 repeats a determination process in step S102 until the turn-on of the IG 103 is detected.

When the turn-on of the IG 103 is detected (step S102, Yes), the controller 3 keeps the first switch 11 off (step S103), and then performs a startup process (step S104). An example of the startup process will be described later with reference to FIGS. 6 to 8. Subsequently, the controller 3 performs the post-startup process (step S105).

In the post-startup process, for example, when a power supply failure of the first system 110 is detected in the state illustrated in FIG. 4, the controller 3 turns off the third switch 13, the fourth switch 14, and the sixth switch 16, and supplies electric power from the sub-power supply 20 to the first load 101 and the second load 102. Accordingly, the power supply control device 1 may continue the operation of the first load 101 and the second load 102 even when the power supply failure occurs in the first system 110.

For example, when a power supply failure of the second system 120 is detected in the state illustrated in FIG. 4, the controller 3 turns off the third switch 13, the fifth switch 15, and the seventh switch 17 and supplies electric power from the main power supply 10 to the first load 101 and the second load 102. Accordingly, the power supply control device 1 may continue the operation of the first load 101 and the second load 102 even when the power supply failure occurs in the second system 120.

Thereafter, the controller 3 determines whether the turn-off of the IG 103 is detected (step S106). In response to determining that the turn-off of the IG 103 is not detected (step S106, No), the controller 3 moves the process to step S105. In response to determining that the turn-off of the IG 103 is detected (step S106, Yes), the controller 3 ends the process and starts the process again from step S101.

Figure 6:
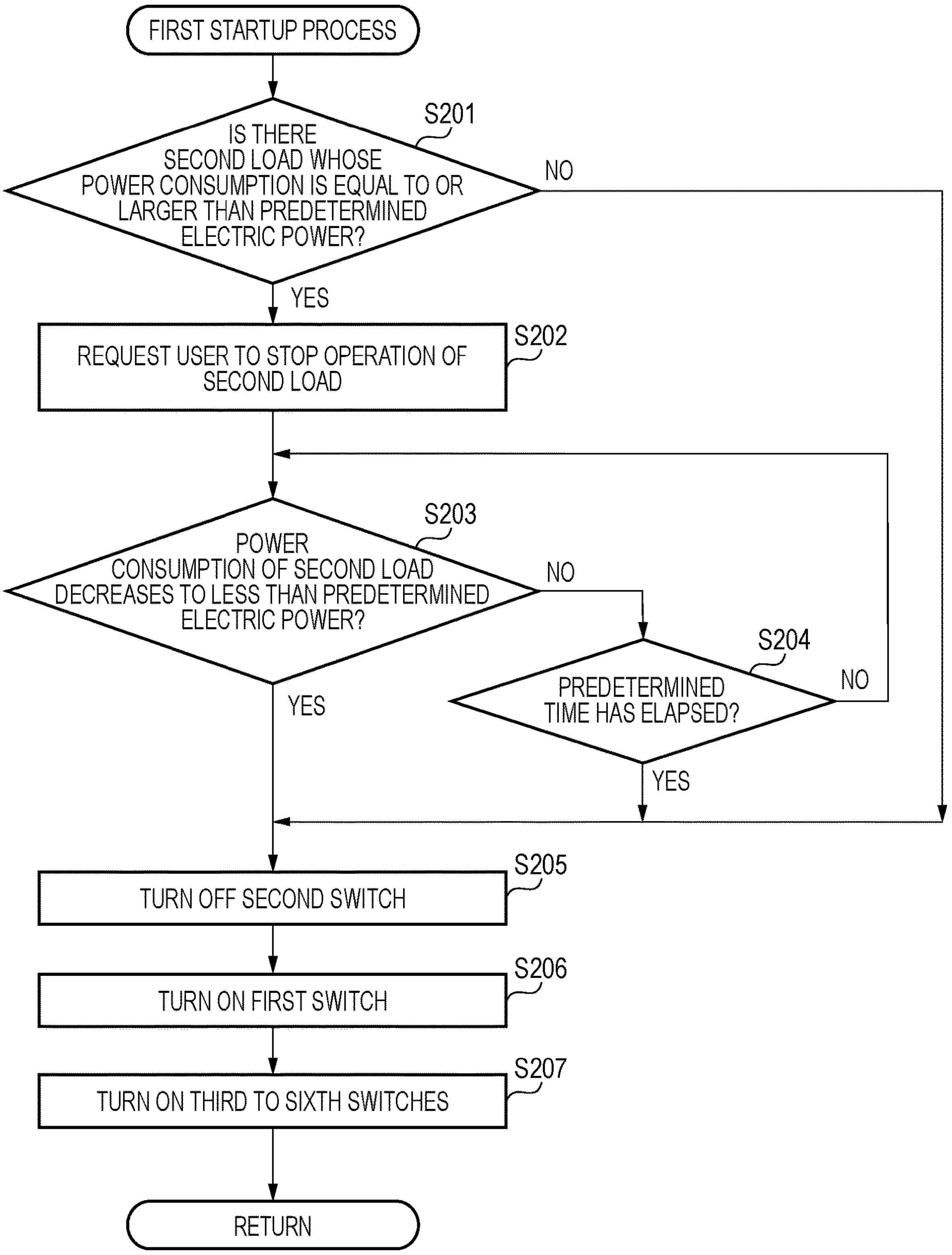
FIG. 6 is a flowchart illustrating an example of a process performed by the controller of the power supply control device according to the first embodiment.

In step S104, the controller 3 performs, for example, a first startup process illustrated in FIG. 6. Specifically, as illustrated in FIG. 6, upon starting the first startup process, the controller 3 first determines whether there is the second load 102 whose power consumption is equal to or larger than the predetermined electric power (step S201).

In response to determining that there is no second load 102 whose power consumption is equal to or larger than the predetermined electric power (step S201, No), the controller 3 moves the process to step S205. In response to determining that there is the second load 102 whose power consumption is equal to or larger than the predetermined electric power (step S201, Yes), the controller 3 requests the user to stop the operation of the second load 102 (step S202).

Accordingly, in the power supply control device 1, if the user stops the operation of the second load 102 in response to the stop request, no current flows through the second switch 12 when the second switch 12 is turned off as the IG 103 is turned on, and thus a failure of the second switch 12 due to a surge may be prevented.

Subsequently, the controller 3 determines whether the power consumption of the second load 102 decreases to less than the predetermined electric power (step S203). In response to determining that the power consumption of the second load 102 decreases to less than the predetermined electric power (step S203, Yes), the controller 3 turns off the second switch 12 from the state illustrated in FIG. 4 (step S205), and then turns on the first switch 11 (step S206).

Accordingly, in the power supply control device 1, since the current flowing through the second switch 12 decreases at the time when the second switch 12 is turned off, even when the second switch 12 is turned off, a failure of the second switch 12 due to a surge may be prevented.

After step S206, the controller 3 turns on the third to sixth switches 13 to 16 (step S207) and sets the state illustrated in FIG. 4. The controller 3 moves the process to step S105 illustrated in FIG. 5.

In response to determining that the power consumption of the second load 102 does not decrease to less than the predetermined electric power (step S203, No), the controller 3 determines whether a predetermined time period has elapsed after requesting to stop the operation of the second load 102 (step S204). In response to determining that the predetermined time period has not elapsed (step S204, No), the controller 3 moves the process to step S203.

In response to determining that the predetermined time period has elapsed (step S204, Yes), the controller 3 moves the process to step S205. Accordingly, if the user stops the operation of the second load 102 in response to the stop request during the predetermined time period, when the second switch 12 is turned off, the power supply control device 1 may prevent the failure of the second switch 12 due to the surge and prevent a delay in the start of a post-startup process.

Figure 7:
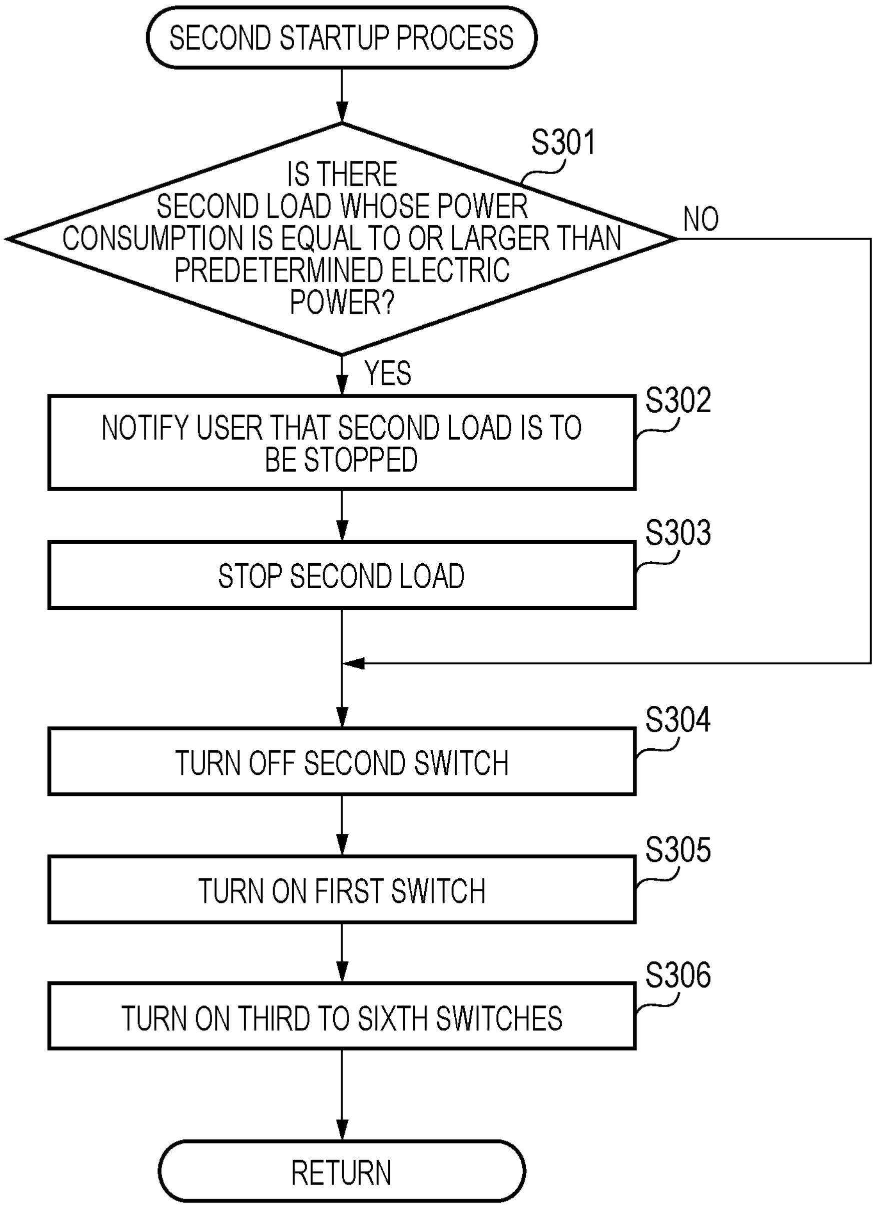
FIG. 7 is a flowchart illustrating an example of processing performed by the controller of the power supply control device according to the first embodiment.

In step S104, the controller 3 may perform, for example, a second startup process illustrated in FIG. 7. Specifically, as illustrated in FIG. 7, upon starting the second startup process, the controller 3 first determines whether there is the second load 102 whose power consumption is equal to or larger than the predetermined electric power (step S301). In response to determining that there is no second load 102 whose power consumption is equal to or larger than the predetermined electric power (step S301, No), the controller 3 moves the process to step S304.

In response to determining that there is the second load 102 whose power consumption is equal to or larger than the predetermined electric power (step S301, Yes), the controller 3 notifies the user that the second load 102 is to be stopped (step S302), and subsequently stops the second load 102 (step S303). Thereafter, the controller 3 turns off the second switch 12 (step S304), then turns on the first switch 11 (step S305), and turns on the third to sixth switches 13 to 16 (step S306). The controller 3 moves the process to step S105 illustrated in FIG. 5.

Accordingly, since the second load 102 is not already operated and no current flows through the second switch 12 at the time of turning off the second switch 12, the power supply control device 1 may prevent the failure of the second switch 12 due to the surge when the second switch 12 is turned off.

Figure 8:
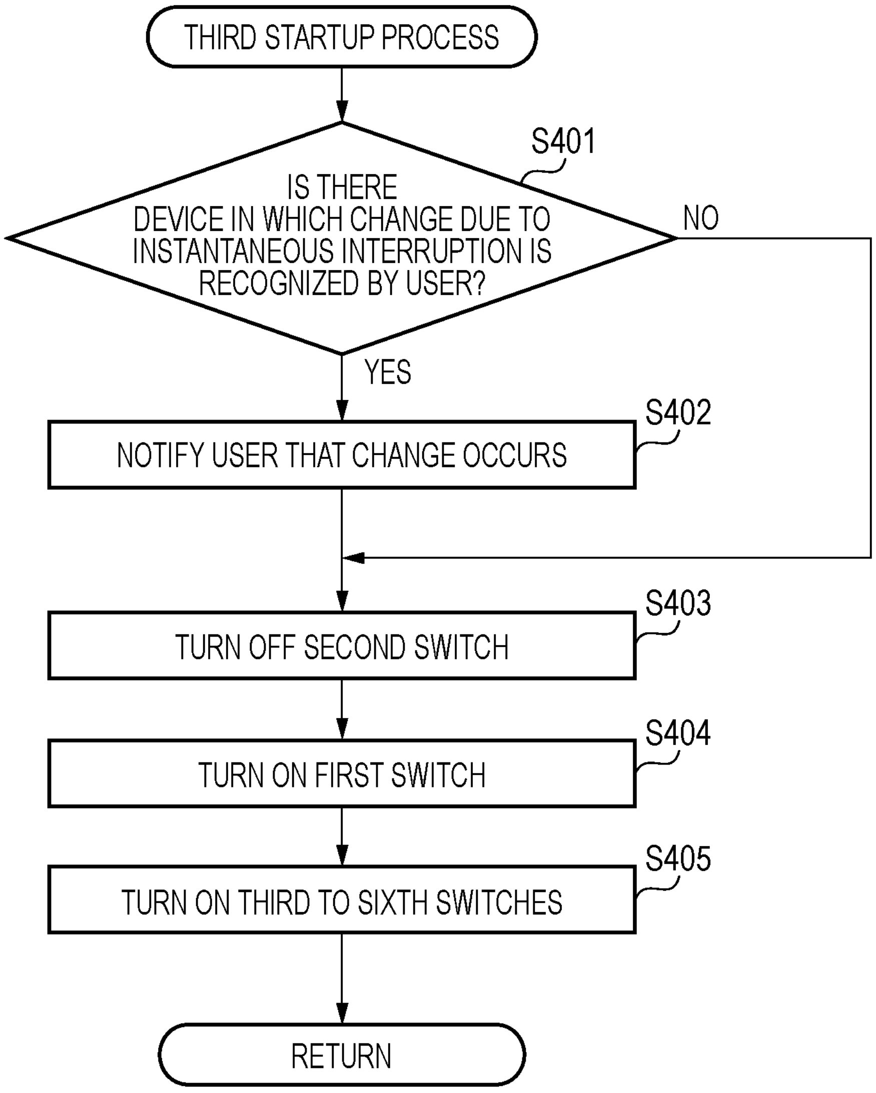
FIG. 8 is a flowchart illustrating an example of a process performed by the controller of the power supply control device according to the first embodiment.

In step S104, the controller 3 may perform, for example, a third startup process illustrated in FIG. 8. Specifically, as illustrated in FIG. 8, upon starting the third startup process, the controller 3 first determines whether there is a device in which a change due to instantaneous interruption of electric power supply is recognized by the user (step S401).

The device in which a change due to instantaneous interruption is recognized by the user is, for example, a drive recorder with a built-in display, an electronic device operated by electric power supply from the in-vehicle outlet, or an electric appliance.

In response to determining that there is no device in which a change due to instantaneous interruption is recognized by the user (step S401, No), the controller 3 moves the process to step S403. In response to determining that there is a device in which a change due to instantaneous interruption is recognized by the user (step S401, Yes), the controller 3 notifies the user that a change occurs in an operation state of the device in use (step S402). The controller 3 turns off the second switch 12 (step S403), then turns on the first switch 11 (step S404), turns on the third to sixth switches 13 to 16 (step S405), and moves the process to step S105 illustrated in FIG. 5.

At this time, the electric power supply to the second load 102 is instantaneously interrupted by turning off the second switch 12, and the operation state of the second load 102 may change due to a decrease in the supplied electric power. When the first switch 11 is turned on and an operation of the first load 101 is started, a voltage of the main power supply 10 temporarily decreases, and the operation state of the second load 102 may change due to a decrease in the supplied electric power.

Therefore, as described above, the power supply control device 1 notifies the user in advance that a change occurs in the operation state of the device in use. Accordingly, by the power supply control device 1, the user may recognize that the change in the operation state of the device due to the turn-on of the IG 103 is not caused by the failure of the device.

2. Second Embodiment

Figure 9:
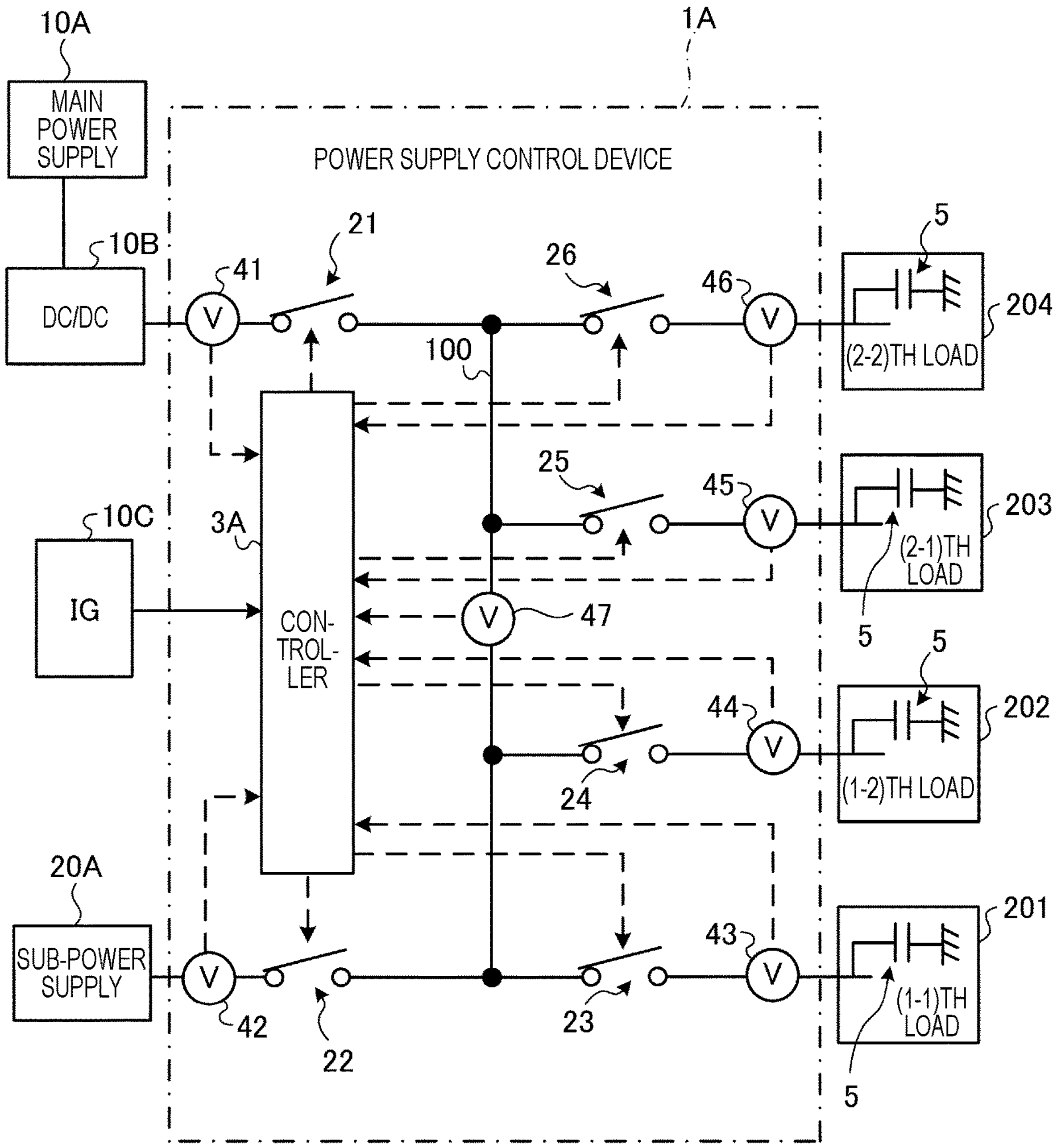
FIG. 9 is a diagram illustrating a configuration example of a power supply control device according to a second embodiment.

2-1. Configuration of Power Supply Control Device according to Second Embodiment Next, a configuration of a power supply control device 1A according to a second embodiment will be described with reference to FIG. 9. FIG. 9 is a diagram illustrating a configuration example of the power supply control device 1A according to the second embodiment. The power supply control device 1A is mounted on an electric vehicle, a hybrid vehicle, or a plug-in hybrid vehicle that travels by electric power supplied from a main power supply 10A illustrated in FIG. 9.

As illustrated in FIG. 9, the power supply control device 1A is connected to a main power supply 10A via a DCDC converter (hereinafter referred to as "DC/DC 10B"). The power supply control device 1A is connected to a sub-power supply 20A. The power supply control device 1A is connected to a (1-1)th load 201, a (1-2)th load 202, a (2-1)th load 203, and a (2-2)th load 204.

The power supply control device 1A is connected to an IG 10C. When turned on, the IG 10C outputs a startup signal to the power supply control device 1A. When turned off, the IG 10C outputs an end signal to the power supply control device 1A.

The main power supply 10A includes a high-voltage battery capable of outputting a voltage higher than that of the sub-power supply. The high-voltage battery is, for example, a lithium-ion battery. The DC/DC 10B steps down the voltage of the main power supply 10A and outputs the voltage to the power supply control device 1A.

The main power supply 10A supplies electric power to the (1-1)th load 201, the (1-2)th load 202, the (2-1)th load 203, and the (2-2)th load 204 in addition to a motor that drives the vehicle via the DC/DC 10B and the power supply control device 1A.

The sub-power supply 20A includes a low-voltage battery capable of outputting a voltage lower than that of the high-voltage battery. The low-voltage battery is, for example, a lead battery. The low-voltage battery may be a lithium-ion battery. The sub-power supply 20A supplies electric power to the (1-1)th load 201, the (1-2)th load 202, the (2-1)th load 203, and the (2-2)th load 204 via the power supply control device 1A.

The (1-1)th load 201, the (1-2)th load 202, the (2-1)th load 203, and the (2-2)th load 204 are electrical loads mounted on the vehicle. The (1-1)th load 201, the (1-2)th load 202, the (2-1)th load 203, and the (2-2)th load 204 include, for example, an engine control device, a steering control device, a brake control device, an audio device, and a video display device.

The (1-1)th load 201, the (1-2)th load 202, the (2-1)th load 203, and the (2-2)th load 204 include, for example, a drive recorder, a security device, and an in-vehicle outlet for supplying electric power to an external device. In the following description, the (1-1)th load 201, the (1-2)th load 202, the (2-1)th load 203, and the (2-2)th load 204 may be collectively referred to simply as loads.

In the present embodiment, it is assumed that the (1-1)th load 201 and the (1-2)th load 202 are loads having the same function. In the present embodiment, it is assumed that the (2-1)th load 203 and the (2-2)th load 204 are loads having the same function. However, the (2-1)th load 203 and the (2-2)th load 204 have functions different from those of the (1-1)th load 201 and the (1-2)th load 202.

The (1-1)th load 201, the (1-2)th load 202, the (2-1)th load 203, and the (2-2)th load 204 each include a capacitor 5. The capacitor 5 smooths and stabilizes electric power supplied from the power supply control device 1A and stores the electric power.

Accordingly, the (1-1)th load 201, the (1-2)th load 202, the (2-1)th load 203, and the (2-2)th load 204 may maintain the operation even when the electric power supply from the power supply control device 1A is instantaneously interrupted while the electric power stored in the capacitor 5 remains.

The power supply control device 1A includes a first switch 21, a second switch 22, a third switch 23, a fourth switch 24, a fifth switch 25, a sixth switch 26, and a controller 3A.

The power supply control device 1A further includes a first voltage sensor 41, a second voltage sensor 42, a third voltage sensor 43, a fourth voltage sensor 44, a fifth voltage sensor 45, a sixth voltage sensor 46, and a seventh voltage sensor 47.

The first switch 21 is a switch that connects the main power supply 10A to a load. The second switch 22 is a switch that connects the sub-power supply 20A to a load. Specifically, the first switch 21 has one end connected to the main power supply 10A via the DC/DC 10B and the other end connected to a shared wiring 100 shared by the (1-1)th load 201, the (1-2)th load 202, the (2-1)th load 203, and the (2-2)th load 204. The second switch 22 has one end connected to the sub-power supply 20A and the other end connected to the shared wiring 100.

The third switch 23 is a switch that connects the shared wiring 100 and the (1-1)th load 201. The fourth switch 24 is a switch that connects the shared wiring 100 and the (1-2)th load 202. The fifth switch 25 is a switch that connects the shared wiring 100 and the (2-1)th load 203. The sixth switch 26 is a switch that connects the shared wiring 100 and the (2-2)th load 204.

The first voltage sensor 41 detects a voltage of a connection line connecting the first switch 21 and the DC/DC 10B, and outputs a detection result to the controller 3A. The second voltage sensor 42 detects a voltage of a connection line connecting the second switch 22 and the sub-power supply 20A, and outputs a detection result to the controller 3A.

The third voltage sensor 43 detects a voltage of a connection line connecting the third switch 23 and the (1-1)th load 201, and outputs a detection result to the controller 3A. The fourth voltage sensor 44 detects a voltage of a connection line connecting the fourth switch 24 and the (1-2)th load 202, and outputs a detection result to the controller 3A.

The fifth voltage sensor 45 detects a voltage of a connection line connecting the fifth switch 25 and the (2-1)th load 203, and outputs a detection result to the controller 3A. The sixth voltage sensor 46 detects a voltage of a connection line connecting the sixth switch 26 and the (2-2)th load 204, and outputs a detection result to the controller 3A. The seventh voltage sensor 47 detects a voltage of the shared wiring 100 and outputs a detection result to the controller 3A.

The controller 3A includes a microcomputer including a CPU, a ROM, and a RAM, and various circuits. The controller 3A controls the first to sixth switches 21 to 26 by the CPU executing a power supply control program stored in the ROM using the RAM as a work area.

A part or all of the controller 3A may be implemented by hardware such as an application specific integrated circuit (ASIC) or a field programmable gate array (FPGA).

The controller 3A electrically connects (conducts) both terminals of the first to sixth switches 21 to 26 by turning on the first to sixth switches 21 to 26, respectively. The controller 3A electrically disconnects both terminals of the first to sixth switches 21 to 26 by turning off the first to sixth switches 21 to 26, respectively.

2-2. Operation Example of Power Supply Control Device According to Second Embodiment Next, an operation example of the power supply control device 1A according to the second embodiment will be described with reference to FIGS. 10 to 13. FIGS. 10 to 13 are diagrams illustrating the operation example of the power supply control device 1A according to the second embodiment.

Figure 10:
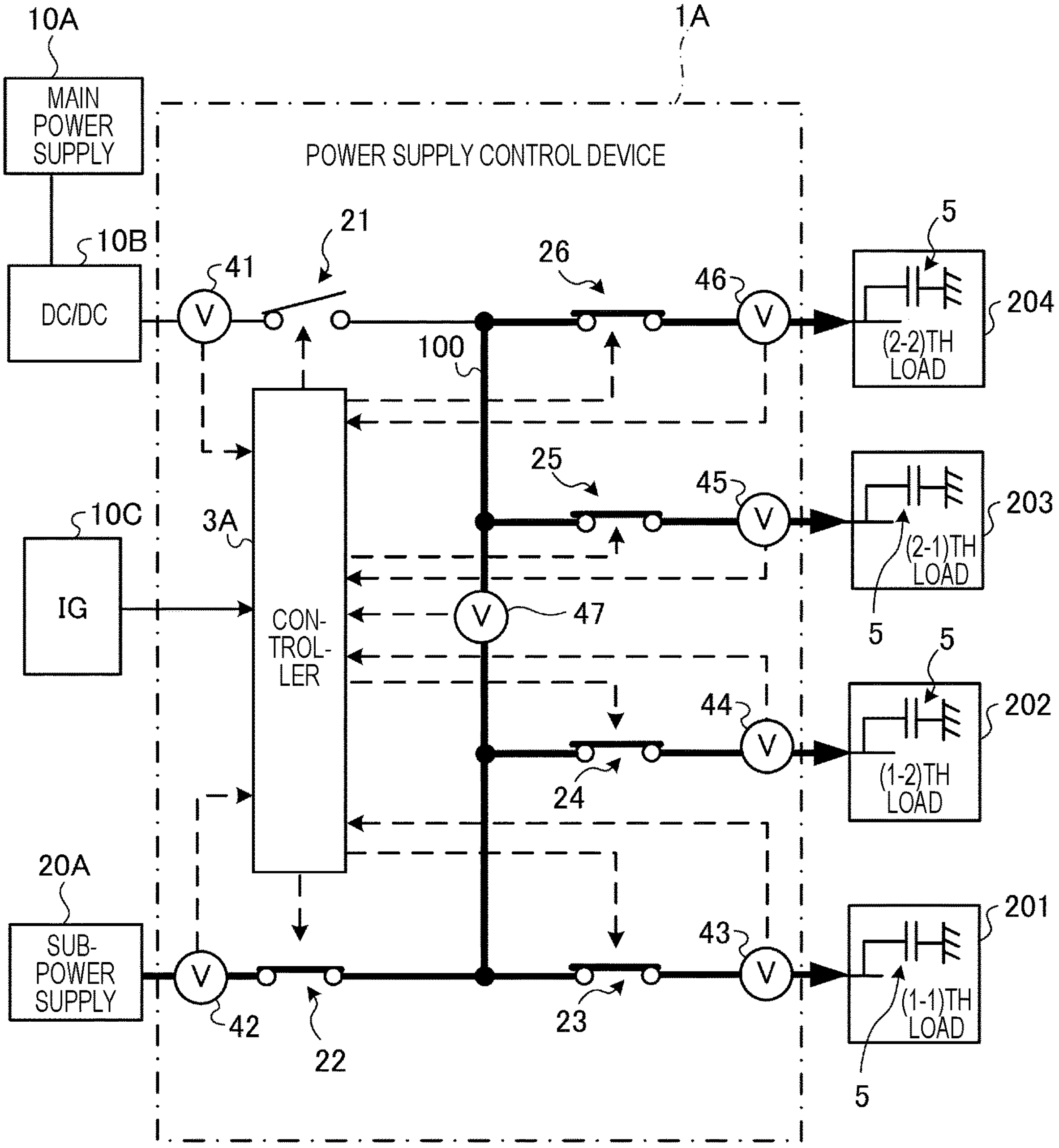
FIG. 10 is a diagram illustrating an operation example of the power supply control device according to the second embodiment.

When the vehicle is in parking, that is, the IG is turned off, as illustrated in FIG. 10, the controller 3A turns off the first switch 21, and turns on the second switch 22. Further, the controller 3A turns on the third to sixth switches 23 to 26.

Accordingly, the (1-1)th load 201, the (1-2)th load 202, the (2-1)th load 203, and the (2-2)th load 204 may continue to operate by electric power supplied from the sub-power supply 20A via the power supply control device 1A during a period in which the IG is turned off.

Thereafter, when the IG 10C is turned on and a startup signal is input from the IG 10C, the controller 3A supplies electric power from the main power supply 10A to the (1-1)th load 201, the (1-2)th load 202, the (2-1)th load 203, and the (2-2)th load 204.

At this time, in a state illustrated in FIG. 10, that is, when the IG 10C is turned on during the electric power supply from the sub-power supply 20A to a load and the first switch 21 is turned on to start the electric power supply from the main power supply 10A to the load, a surge may occur to cause a failure of the second switch 22.

Figure 11:
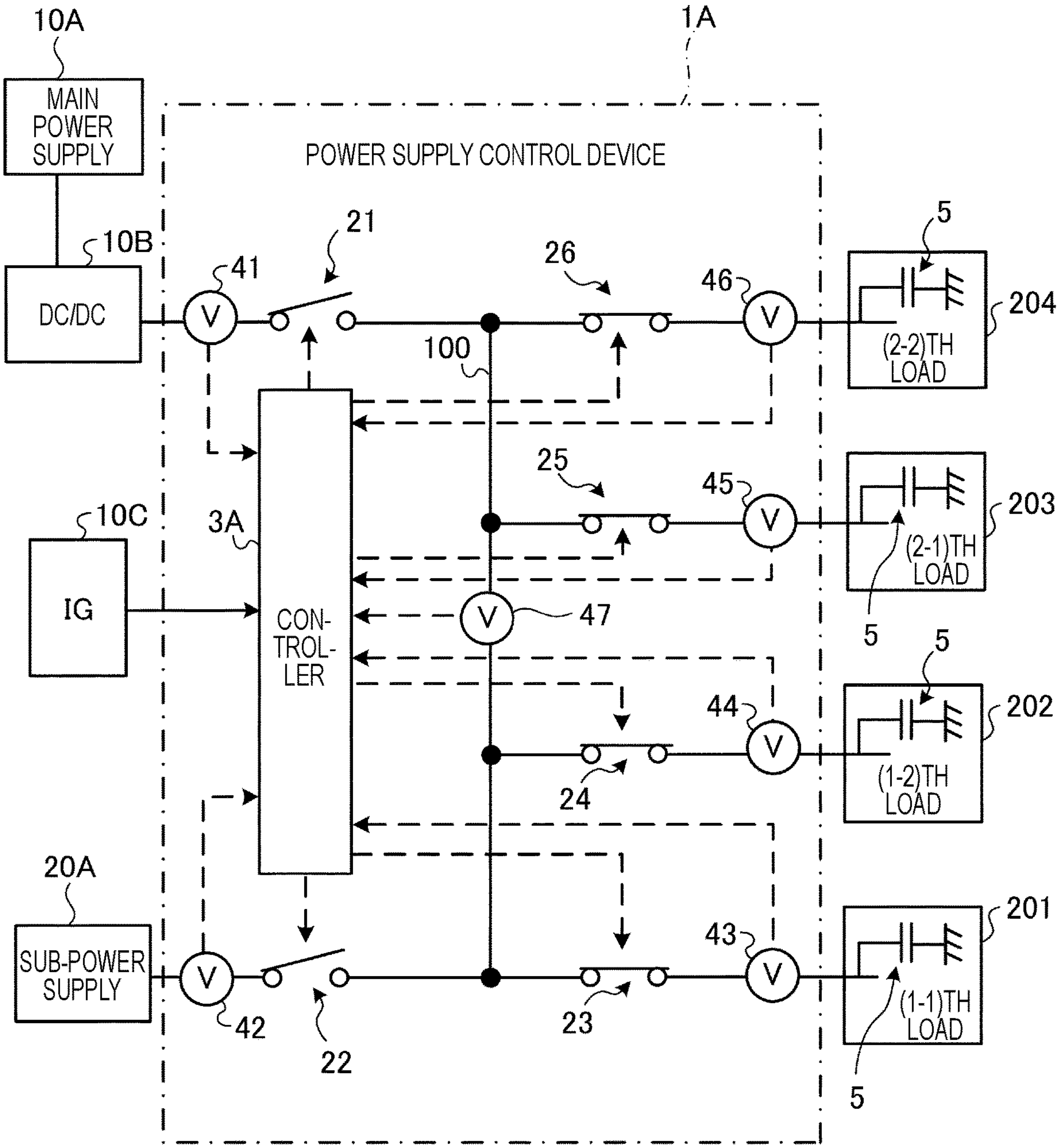
FIG. 11 is a diagram illustrating an operation example of the power supply control device according to the second embodiment.
Figure 12:
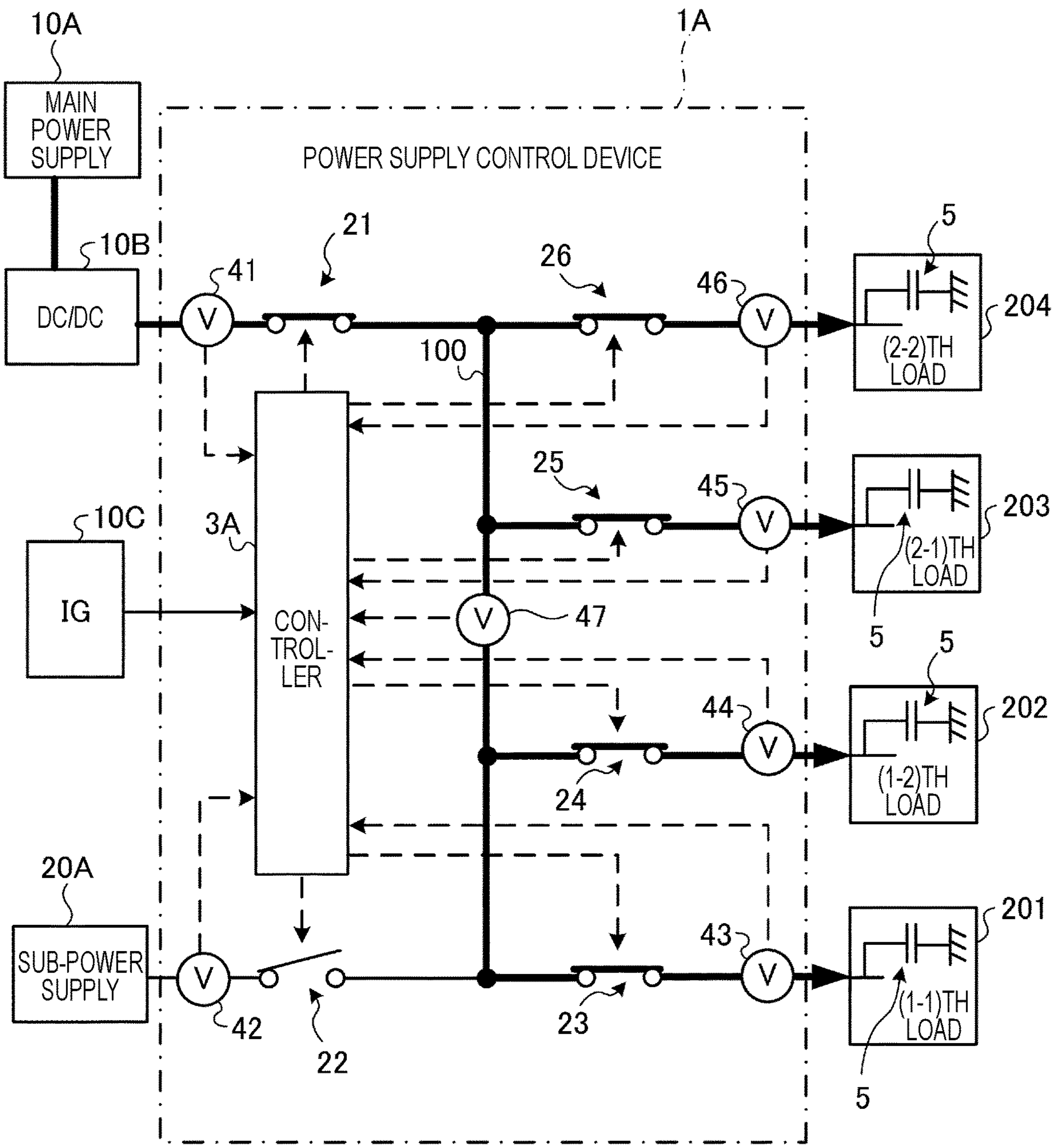
FIG. 12 is a diagram illustrating an operation example of the power supply control device according to the second embodiment.

Therefore, when the IG 10C is turned on while the IG 10C illustrated in FIG. 10 is turned off, the controller 3 turns off the second switch 22 as illustrated in FIG. 11, and then turns on the first switch 21 as illustrated in FIG. 12.

Accordingly, since the second switch 22 is already turned off and no current flows through the shared wiring 100 when the first switch 21 is turned on, the power supply control device 1A may prevent a failure of the second switch 22 even when a surge occurs by turning on the first switch 21.

Figure 13:
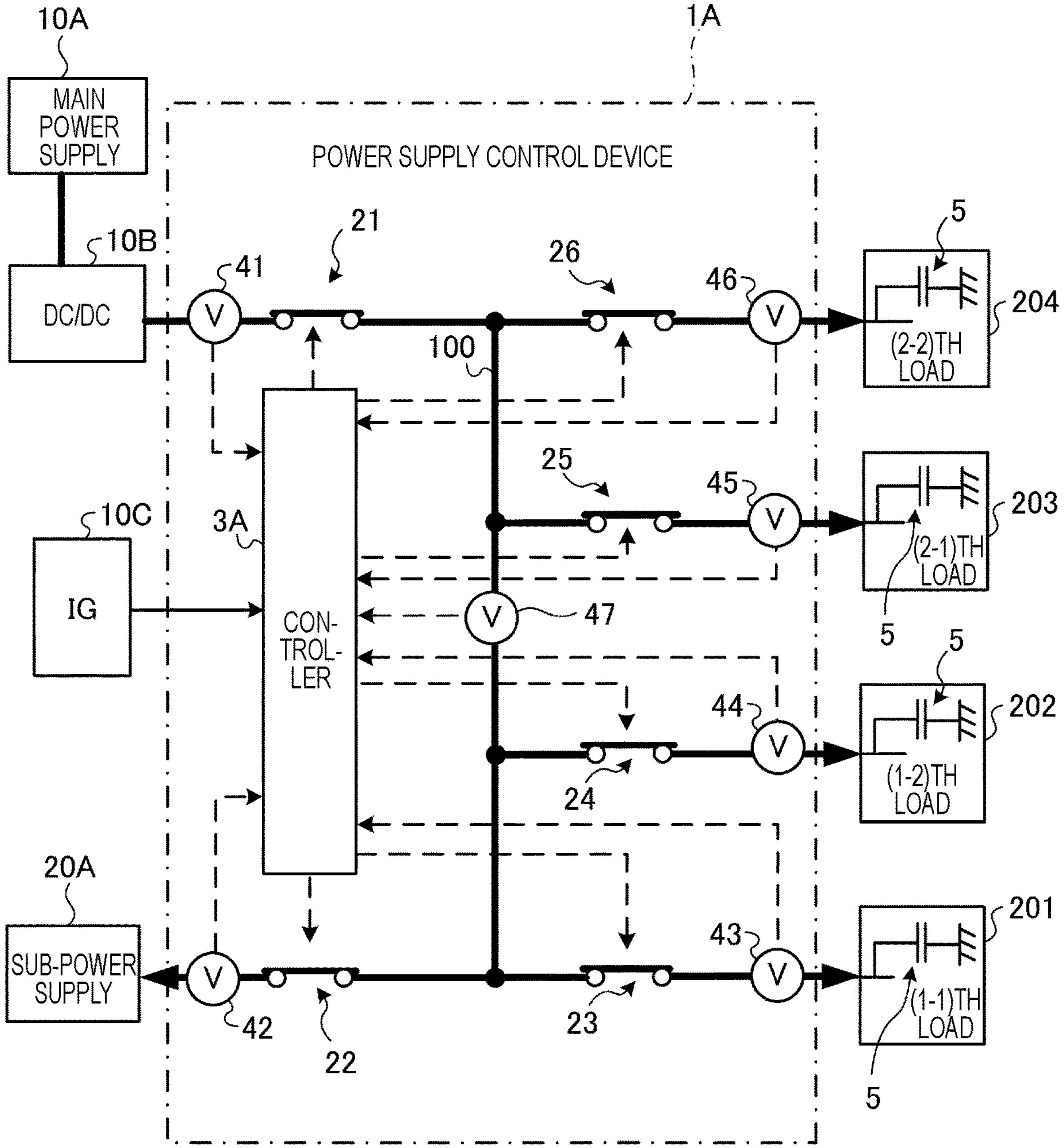
FIG. 13 is a diagram illustrating an operation example of the power supply control device according to the second embodiment.

Thereafter, as illustrated in FIG. 13, the controller 3A turns on the second switch 22. That is, when the IG 10C is turned on, the controller 3A turns on the first switch 21 after turning off the second switch 22, and then turns on the second switch.

Accordingly, the power supply control device 1A may charge the sub-power supply 20A while preventing a failure of the second switch 22 by turning on the second switch 22 again after the electric power supply from the main power supply 10A to a load is stabilized.

When the IG is switched from off to on, the controller 3 turns off the second switch 22, and then turns on the first switch 21 at a timing at which an operation of each load is not stopped even when the electric power supply to each load is instantaneously interrupted.

Specifically, when the IG 10C is turned on, the controller 3A turn on the first switch 21 during a period from when the second switch 22 is turned off to when a time period during which each load may maintain the operation by electric power of the capacitor 5 included in the load elapses.

Accordingly, after the second switch 22 is turned off in a state where the first switch 21 is turned off, the power supply control device 1A may maintain the operation of each load by turning on the first switch 21 while the operation of each load is maintained by the electric power of the capacitor 5 even when the electric power supply to each load is instantaneously interrupted.

2-3. Process Performed by Controller According to Second Embodiment

Figure 14:
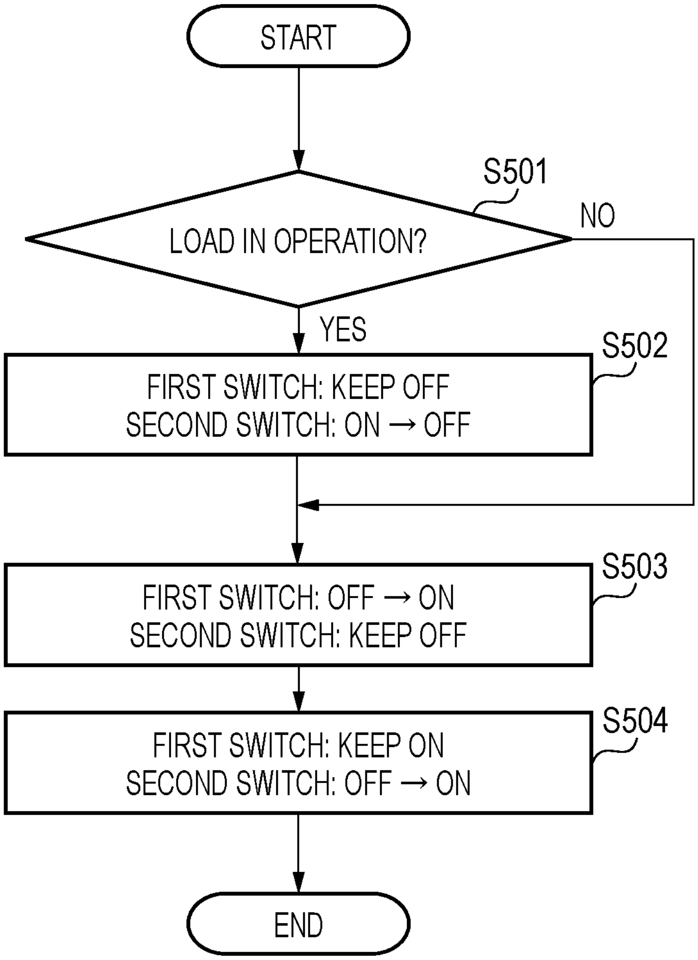
FIG. 14 is a flowchart illustrating an example of a process performed by a controller of the power supply control device according to the second embodiment.

Next, a process performed by the controller 3A of the power supply control device 1A will be described with reference to FIG. 14. FIG. 14 is a flowchart illustrating an example of the process performed by the controller 3A of the power supply control device 1A according to the second embodiment.

When the IG 10C is switched from off to on, the controller 3A starts a process illustrated in FIG. 14. Therefore, the controller 3A starts the process illustrated in FIG. 14 from a state where the power supply control device 1A is in the state illustrated in FIG. 10, that is, a state where the first switch 21 is turned off and the second to sixth switches 22 to 26 are turned on.

Specifically, as illustrated in FIG. 14, when the IG 10C is turned on, the controller 3A first determines whether the load is in operation (step S501). In response to determining that the load is in operation (step S501, Yes), the controller 3A keeps the first switch 21 off and turns off the second switch 22 (step S502). Accordingly, the power supply control device 1A is in a state illustrated in FIG. 11.

That is, when at least one of the (1-1)th load 201, the (1-2)th load 202, the (2-1)th load 203, and the (2-2)th load 204 is operating, the controller 3A keeps the first switch 21 off, and turns off the second switch 22. Accordingly, the controller 3A may be in a state where no current temporarily flows through the shared wiring 100.

Thereafter, the controller 3A moves the process to step S503. In response to determining that the load is not in operation (step S501, No), the controller 3A moves the process to step S503. That is, when all of the (1-1)th load 201, the (1-2)th load 202, the (2-1)th load 203, and the (2-2)th load 204 are not operating, the controller 3A moves the process to step S503.

In step S503, the controller 3A turns on the first switch 21 and keeps the second switch 22 off. In response to No in step S501, the controller 3A switches the second switch 22 from on to off. Accordingly, the power supply control device 1A is in a state illustrated in FIG. 12.

Thereafter, the controller 3A keeps the first switch 21 on, turns on the second switch 22 (step S504), and ends the process. Accordingly, the power supply control device 1A is in a state illustrated in FIG. 13.

The controller 3A may also turn off the second switch 22 when the charging of the sub-power supply 20A is completed. In this case, the controller 3A determines whether the charging of the sub-power supply 20A is completed based on the detection result of the second voltage sensor 42.

After the charging of the sub-power supply 20A is completed and the second switch 22 is turned off, the controller 3A may turn on the second switch 22 again when a power storage amount of the sub-power supply 20A is equal to or smaller than a predetermined power storage amount. In this case, the controller 3A determines whether the power storage amount of the sub-power supply 20A is equal to or smaller than the predetermined power storage amount based on the detection result of the second voltage sensor 42.

2-4. Operation of Power Supply Control Device According to Second Embodiment at Time of Detection of Ground Fault In the power supply control device 1A, in the state illustrated in FIG. 13, that is, in a state where the IG is turned on and the first to sixth switches 21 to 26 are finally turned on, a ground fault may occur between the power supply control device 1A and the DC/DC 10B, the sub-power supply 20A, or a load.

Therefore, the controller 3A detects an occurrence of a ground fault based on the detection results of the first to seventh voltage sensors 41 to 47, specifies an occurrence point of the ground fault, and performs fail-safe control of disconnecting connection between the ground fault point and the power supply control device 1A.

When the voltage detected by any one of the first to seventh voltage sensors 41 to 47 is equal to or smaller than a ground fault threshold, the controller 3A detects that a ground fault occurs. In response to detecting that a ground fault occurs, the controller 3A turns off all of the third to sixth switches 23 to 26 which are the load switches in a state where the first switch 21 and the second switch 22 are turned on.

When a ground fault occurs between the power supply control device 1A and a load, the voltages detected by the first voltage sensor 41 and the second voltage sensor 42 return to original states by turning off all of the third to sixth switches 23 to 26. If the voltage detected by the first voltage sensor 41 or the second voltage sensor 42 returns to a threshold voltage or more, the controller 3A determines that a ground fault occurs between the power supply control device 1A and a load.

In this case, the controller 3A sequentially turns on the third to sixth switches 23 to 26 to specify the load where the ground fault occurs. Specifically, the controller 3A first turns on the third switch 23 (turns off the fourth switch 24 to the sixth switch 26).

At this time, if the voltage detected by the third voltage sensor 43 (or the voltage detected by the first voltage sensor 41 or the second voltage sensor 42) is equal to or smaller than a threshold, the controller 3A determines that a ground fault occurs between the (1-1)th load 201 and the power supply control device 1A, that is, a ground fault occurs in the (1-1)th load 201.

In this case, the controller 3A turns off only the third switch 23 closest to the (1-1)th load 201 as the ground fault point and capable of disconnecting the load, and turns on other switches. Accordingly, the controller 3A may perform the fail-safe control of disconnecting the ground fault point from the power supply control device 1A.

On the other hand, when the third switch 23 is turned on (the fourth switch 24 to the sixth switch 26 are turned off), if the voltage detected by the third voltage sensor 43 returns to the threshold or more, the controller 3A determines that no ground fault occurs between the (1-1)th load 201 and the power supply control device 1A, that is, the (1-1)th load 201 is normal.

In this case, the controller 3A then turns on the fourth switch 24 (the third switch 23 and the fifth switch 25 to the sixth switch 26 are turned off), and similarly specifies whether a ground fault occurs between the (1-2)th load 202 and the power supply control device 1A, that is, whether a ground fault occurs in the (1-2)th load 202. Thereafter, similarly, the controller 3A sequentially turns on the fifth switch 25 and the sixth switch 26 until a load in which a ground fault occurs may be specified, and specifies the load in which the ground fault occurs.

When the specification of the load in which the ground fault occurs is completed, the controller 3A turns off a load switch closest to the ground fault point and capable of disconnecting the specified load, and turns on other load switches to perform the fail-safe control.

For example, when the controller 3A specifies that the ground fault point is the (2-1)th load 203 and the power supply control device 1A, the controller 3A turns off the fifth switch 25, which is a load switch closest to the ground fault point and capable of disconnecting the specified load, and turns on other load switches (the third switch 23, the fourth switch 24, and the sixth switch 26). Accordingly, the controller 3A disconnects the (2-1)th load 203 which is the ground fault point, and performs the fail-safe control using a load other than the (2-1)th load 203.

When the controller 3A detects the occurrence of the ground fault and turns off all of the third to sixth switches 23 to 26 which are the load switches in a state where the first switch 21 and the second switch 22 are turned on, if the voltage detected by the first voltage sensor 41 or the second voltage sensor 42 does not return to the threshold or more, the controller 3A determines that a ground fault occurs between the power supply control device A1 and the DC/DC 10B or between the power supply control device A1 and the sub-power supply 20A.

In this case, the controller 3A then turns off the first switch 21, turns on the second switch 22, and turns on the third to sixth switches 23 to 26. At this time, if a ground fault occurs between the power supply control device A1 and the DC/DC 10B, even if the first switch 21 is turned off, the voltage detected by the first voltage sensor 41 remains decreased to the threshold or less. On the other hand, if no ground fault occurs between the power supply control device A1 and the DC/DC 10B, the voltage detected by the first voltage sensor 41 returns to the threshold or more by turning off the first switch 21.

Therefore, when the first switch 21 is turned off, the second switch 22 is turned on, and the third to sixth switches 23 to 26 are turned on, if the voltage detected by the first voltage sensor 41 is equal to or smaller than the threshold, the controller 3A determines that a ground fault occurs between the power supply control device A1 and the DC/DC 10B, that is, a ground fault occurs in the main power supply 10A side.

In this case, the controller 3A turns off the first switch 21, which is a switch closest to the ground fault point and capable of disconnecting the ground fault point, turns on the second switch 22, and turns on the third to sixth switches 23 to 26, thereby disconnecting the main power supply 10A side, which is the ground fault point, and executing the fail-safe control using the sub-power supply 20A.

On the other hand, when the first switch 21 is turned off, the second switch 22 is turned on, and the third to sixth switches 23 to 26 are turned on, if the voltage detected by the first voltage sensor 41 returns to the threshold or more, the controller 3A determines that no ground fault occurs between the power supply control device A1 and the DC/DC 10B, that is, the main power supply side is normal.

In this case, the controller 3A then turns off the second switch 22, turns on the first switch 21, turns on the third to sixth switches 23 to 26, and similarly determines whether a ground fault occurs between the power supply control device A1 and the sub-power supply 20A based on the voltage detected by the second voltage sensor 42.

When the controller 3A determines that a ground fault occurs between the power supply control device A1 and the sub-power supply 20A, that is, a ground fault occurs in a sub-power supply 20A side, the controller 3A turns off the second switch 22, which is a switch closest to the ground fault point and capable of disconnecting the ground fault point, turns on the first switch 21, and turns on the third to sixth switches 23 to 26, thereby disconnecting the sub-power supply 20A side, which is the ground fault point, and executing the fail-safe control using the main power supply 10A.

In this manner, when an occurrence point of a ground fault is specified, the controller 3A turns off a switch closest to the occurrence point of the ground fault among the first switch 21, the second switch 22, and the load switches (the third to sixth switches 23 to 26). In other words, the controller 3 turns off the switch capable of disconnecting the occurrence point of the ground fault. Accordingly, the controller 3A may perform the fail-safe control by disconnecting the occurrence point of the ground fault from the power supply control device 1A.

3. Appendix

As an appendix, the features of the present disclosure are illustrated below.

(1) A power supply control device including:

a first switch coupled between a main power supply and a load;

a second switch coupled between a sub-power supply and the load; and a controller configured to perform on/off control of the first switch and the second switch, in which the controller is configured to:

turn off the first switch and turn on the second switch, in response to an ignition switch being turned off; and turn off the second switch and then turn on the first switch, in response to the ignition switch being turned on.

(2) The power supply control device according to (1), in which the controller is configured to turn on the first switch after turning off the second switch and then turn on the second switch, in response to the ignition switch being turned on.

(3) The power supply control device according to (1) or (2), in which the controller is configured to turn on the first switch during a period in response to the ignition switch being turned on, the period being from when the second switch is turned off to when a time period during which the load is capable of keeping operating by electric power of a capacitor of the load elapses.

(4) The power supply control device according to any one of (1) to (3), further including:

a first system configured to supply electric power from the main power supply to the load via the first switch;

a second system configured to supply electric power from the sub-power supply to the load via the second switch; and an inter-system switch coupled between the first system and the second system, in which the controller is configured to:

in response to the ignition switch being turned off, turn off the inter-system switch; and in response to the ignition switch being turned on, turn on the inter-system switch when turning on the first switch.

(5) The power supply control device according to any one of (1) to (4), further including a load switch coupled between a connection wiring and each of a plurality of loads, the connection wiring connecting the first switch and the second switch, wherein the controller is configured to, when a ground fault is detected, specify an occurrence point of the ground fault, and turn off a switch closest to the occurrence point of the ground fault among the first switch, the second switch, and the load switch.

(6) A non-transitory computer-readable storage medium storing a power supply control program that causes a controller to perform a process, the process including performing on/off control of a first switch configured to connect a main power supply to a load and a second switch configured to connect a sub-power supply to the load, wherein the process further including:

turning off the first switch and turning on the second switch, in response to an ignition switch being turned off; and turning off the second switch and then turning on the first switch, in response to the ignition switch being turned on.

Further effects and modifications can be easily derived by those skilled in the art. Therefore, broader aspects of the present invention are not limited to the specific details and representative embodiments illustrated and described above. Therefore, various modifications can be made without departing from the spirit or scope of the general inventive concept as defined by the appended claims and equivalents thereof.

The invention claimed is:

1. A power supply control device comprising:

a first system configured to supply electric power from a main power supply to a load via a first switch;

a second system configured to supply electric power from a sub-power supply to the load via a second switch;

an inter-system switch coupled between the first system and the second system; and a controller configured to perform on/off control of the first switch and the second switch, wherein the controller is configured to:

(i) turn off the first switch, (ii) turn on the second switch, and (iii) turn off the inter-system switch, in response to an ignition switch being turned off; and (i) turn off the second switch while the first switch is turned off, (ii) then turn on the first switch while the load is capable of keeping operation by electric power of a capacitor of the load, and (iii) turn on the inter-system switch when turning on the first switch, in response to the ignition switch being switched from being turned off to being turned on.

2. The power supply control device according to claim 1, wherein the controller is configured to turn on the first switch after turning off the second switch and then turn on the second switch, in response to the ignition switch being turned on.

3. The power supply control device according to claim 1, further comprising a load switch coupled between a connection wiring and each of a plurality of loads, the connection wiring connecting the first switch and the second switch, wherein the controller is configured to, when a ground fault is detected, specify an occurrence point of the ground fault, and turn off a switch closest to the occurrence point of the ground fault among the first switch, the second switch, and the load switch.

4. The power supply control device according to claim 2, further comprising a load switch coupled between a connection wiring and each of a plurality of loads, the connection wiring connecting the first switch and the second switch, wherein the controller is configured to, when a ground fault is detected, specify an occurrence point of the ground fault, and turn off a switch closest to the occurrence point of the ground fault among the first switch, the second switch, and the load switch.

5. A non-transitory computer-readable storage medium storing a power supply control program that causes a controller to perform a process, the process comprising performing on/off control of a first switch of a first system configured to supply electric power from a main power supply to a load via the first switch and a second switch of a second system configured to supply electric power from a sub-power supply to the load via the second switch, wherein the process further comprises:

(i) turning off the first switch, (ii) turning on the second switch, and (iii) turning on an inter-system switch coupled between the first system and the second system, in response to an ignition switch being turned off; and (i) turning off the second switch while the first switch is turned off, (ii) then turning on the first switch while the load is capable of keeping operation by electric power of a capacitor of the load, and (iii) turning on the inter-system switch when turning on the first switch, in response to the ignition switch being switched from being turned off to being turned on.

6. A power supply control device comprising:

a first system configured to supply electric power from a main power supply to a load via a first switch;

a second system configured to supply electric power from a sub-power supply to the load via a second switch;

an inter-system switch coupled between the first system and the second system; and a controller configured to perform on/off control of the first switch and the second switch, wherein the controller is configured to:

(i) turn off the first switch, (ii) turn on the second switch, and (iii) turn off the inter-system switch, in response to an ignition switch being turned off; and upon the ignition switch being turned on, (i) firstly turn off both of the first and second switches temporarily, (ii) then turn on the first switch while the second switch is maintained turned off and while the load is capable of keeping operation by electric power of a capacitor of the load, and (iii) turn on the inter-system switch when tuning on the first switch.

* * * * *